July 21, 1925.  
W. C. BOTT  
1,546,709  
SAFETY HUNTING KNIFE  
Filed Aug. 26, 1924  
2 Sheets-Sheet 1
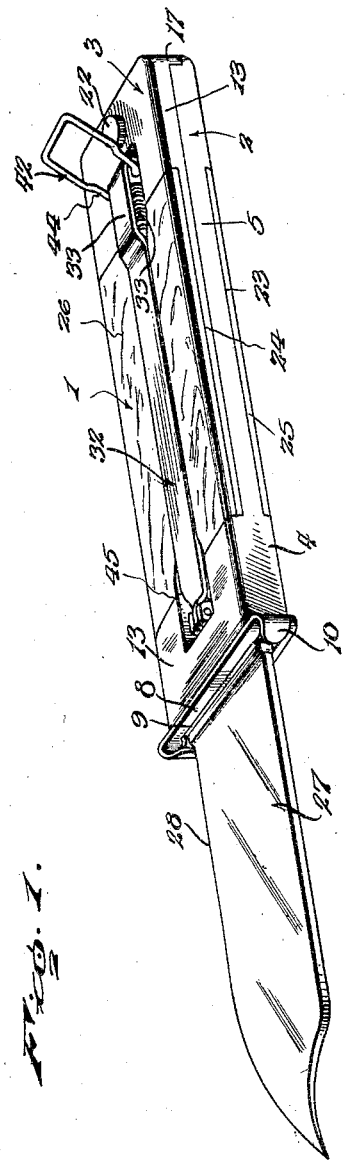
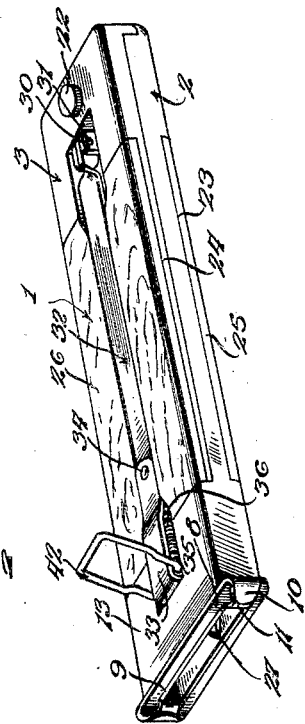
Inventor  
W. C. Bott.  
By Lacy & Lacy, Attorneys

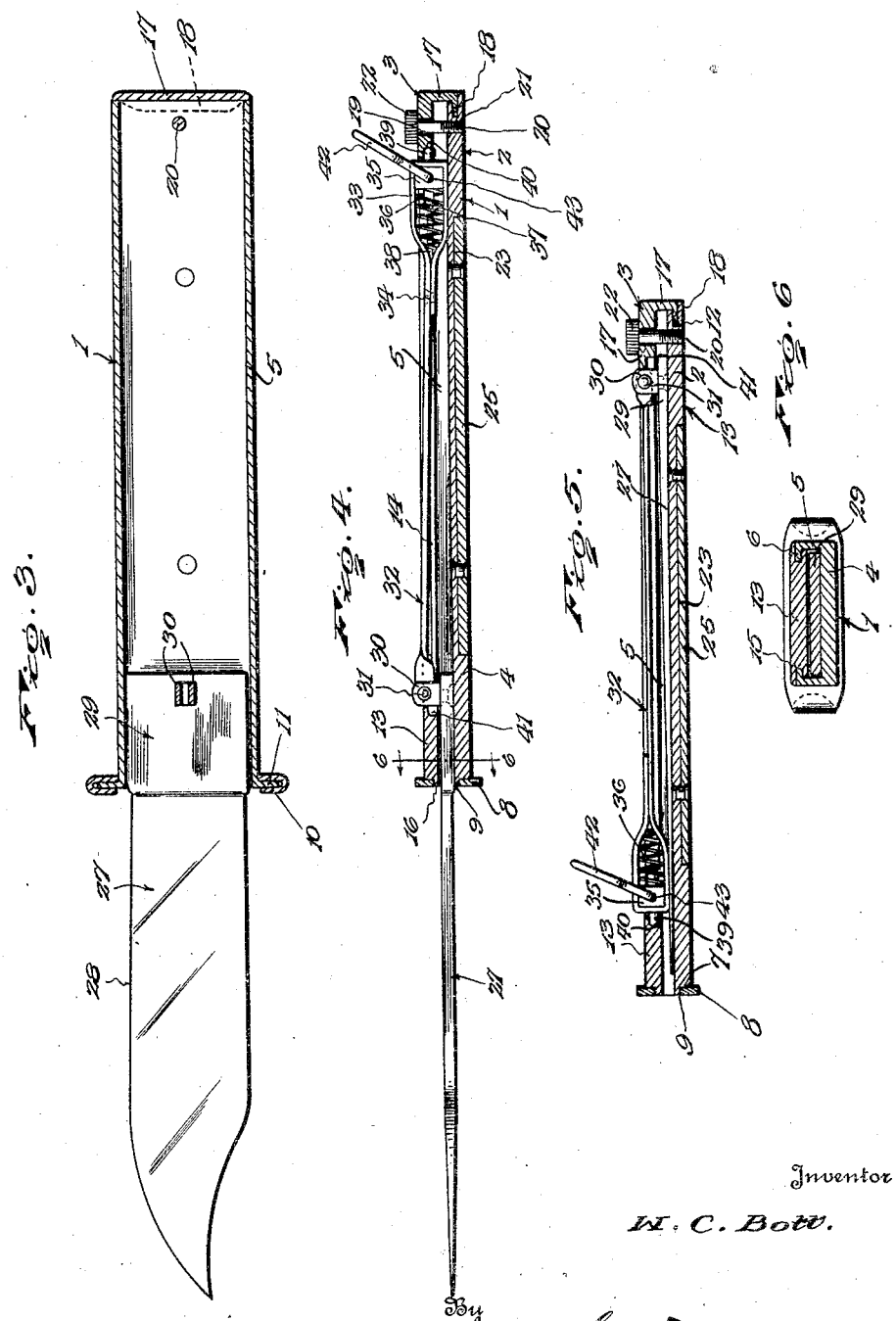

Patented July 21, 1925.

1,546,709

UNITED STATES PATENT OFFICE.

WALTER C. BOTT, OF SEATTLE, WASHINGTON.

SAFETY HUNTING KNIFE.

Application filed August 26, 1924. Serial No. 734,268.

*To all whom it may concern:*

Be it known that I, WALTER C. BOTT, a citizen of the United States, residing at Seattle, in the county of King and State of Washington, have invented certain new and useful Improvements in Safety Hunting Knives, of which the followng is a specification.

This invention relates to improvements in hunting knives and has as its general object to provide a hunting knife which may be carried and handled with safety.

The invention contemplates, broadly speaking, the provision of a hunting knife including a handle, and a blade adapted to be normally housed within the handle and capable of being projected beyond the end of the handle in position for use, and one of the objects of the present invention is to provide novel means for effecting shiftable adjustment of said blade from one position to the other.

Another object of the invention is to provide a shifting means for the blade embodying means for coaction with the handle to securely hold the blade either in its projected position or in its retracted position so that in the former instance there will be no likelihood of the blade sliding back into the handle while the knife is in use and, in the second instance, there will be no likelihood of the blade being accidentally projected.

Another object of the invention is to so construct the handle and so assemble the parts thereof and also the blade therewith, that all of the several parts may be readily separated in a most convenient manner and all thoroughly cleaned, so that while the blade may be retracted into the handle from time to time during a hunting trip and after each use of the knife, at the end of the trip all of the parts may be readily disassembled and thoroughly cleaned and again assembled, whereupon the knife will be ready for a future trip.

In the accompanying drawings:

Figure 1 is a perspective view of a hunting knife constructed in accordance with the present invention, the blade being shown projected and the knife being, therefore, ready for use.

Figure 2 is a similar view illustrating the blade retracted so that the knife may be easily carried in one's pocket.

Figure 3 is a horizontal sectional view through the knife, the handle being shown in section and the blade in plan, and the said blade being projected.

Figure 4 is a vertical longitudinal sectional view through the knife, the blade being shown projected and locked in its projected position.

Figure 5 is a view similar to Figure 4, illustrating the blade retracted and locked in such position.

Figure 6 is a vertical transverse sectional view taken substantally on the line 6—6 of Figure 4, looking in the direction indicated by the arrows.

The handle of the knife is indicated in general by the numeral 1 and comprises two sections indicated in general one by the numeral 2 and the other by the numeral 3 and which sections are constructed, assembled, and separably connected together, in a manner which will now be explained.

The section 2 of the handle comprises a plate 4 formed with upstanding flanges 5 which extend along the longitudinal edges of the plate from one end thereof to the opposite end, the flanges, near the forward end of the handle section, being, in turn, flanged as at 6, the said flanges 6 projecting inwardly toward each other in a plane parallel to and overlying the inner face of the plate 4, for a purpose to be presently explained. At its forward end, the plate 4 comprising the handle section 2, is rabbeted in its outer face as indicated by the numeral 7, and a cross guard 8 is disposed to surround this end of the said handle section, having a rectangular oblong opening 9 therein, for this purpose, and is secured in place by overturning its ends as indicated by the numeral 10, so as to engage over outstanding lugs 11 constituting lateral extensions of the side flanges 5 of the said plate 4. One longitudinal side of the cross guard extends within the rabbet 7 and the opposite side of the cross guard bridges the space between the overturned upper edge portions 6 of the flanges 5. For a purpose to be presently explained, the plate 4 at its rear end is formed with a transversely extending recess 12 which terminates short of the opposite side of this end of the said plate.

The other section 3 of the knife handle comprises a plate 13 which is formed with a longitudinally extending slot indicated by the numeral 14, the said slot terminating short of the opposite end of the said plate. At its forward end, the plate is formed in its opposite longitudinal edges for a portion of its length, with grooves indicated by the numeral 15 and with a projecting tongue portion indicated by the numeral 16. In assembling the section 3 with the section 2, the plate 13 is disposed with its inner side resting at its margins against the upper edges of the flanges 5, and the plate is slid longitudinally into engagement with the said flanges 5 at their overturned portions 6, the said inturned portions of the flanges being received within the grooves 15, as most clearly shown in Figure 6 of the drawings. The projecting tongue portion 16 engages in the opening in the cross guard 8, as shown in Figures 4 and 5 of the drawings. At its rear end, the plate 13 is provided with a right angularly extending transverse flange 17 constituting the end of the handle, and this flange extends across and closes the space between the opposing faces of the plates 4 and 13 at the said rear end of the handle, the flange 17, at its free edge, being turned forwardly to provide a tongue 18 engaging in the recess 12 heretofore referred to, as clearly shown in Figures 4 and 5 of the drawings. In this manner the two plates are held against direct separation from each other, and in order to prevent relative sliding or longitudinal movement of the sections of the handle to effect separation of the said plates, except when desired, the plate 13 is formed at its rear end immediately inwardly of the flange 17, with an opening 19, and a small bolt 20 is fitted through this opening and threaded into an opening 21 formed at a corresponding point in the plate 4, the shank of the bolt being provided at its end opposite its threaded end with a knurled head 22 whereby the bolt may be conveniently rotated by the hand to thread the shank into the opening 21 or unthread the shank therefrom, it being understood that when the bolt is in place, the sections of the handle cannot be separated but that when the bolt is partly removed or at least disengaged from the opening 21, the section 3 may be slid longitudinally with relation to the section 2 until the flanges 6 have become disengaged from the grooves 15, whereupon the sections may be bodily separated.

The outer faces of the plates 4 and 13 are recessed as indicated respectively by the numerals 23 and 24, to receive any suitable facing plates 25 and 26 which may be provided for the purpose of ornamentation or otherwise.

The blade of the knife is indicated by the numeral 27 and the same has the usual form of cutting edge 28 peculiar to knives of this class, the blade being provided at its heel end with a flat substantially rectangular tang indicated by the numeral 29, and the said tang and blade are of such dimensions as to be slidably received in position completely housed within the handle 1, the said blade being at the same time adapted to be slidably adjusted and projected beyond the forward end of the handle, as shown in Figures 1, 3 and 4 of the drawings. The tang 29 of the blade 27 is provided upon that side which is presented toward the plate 13 with a pair of spaced pivot ears indicated by the numeral 30, and pivoted between these ears upon a pin 31 is a blade shifting member indicated in general by the numeral 32, which is to serve a purpose which will now be explained.

The blade shifting member 32 is in the form of a metallic bar which is of substantially the same width as the slot 14 in the plate 13, and at its end opposite its pivoted end, the said bar is provided with a yoke 33 formed by overturning the end portion of the said bar and securing the extremity thereof as at 34, to the bar near its said end. This yoke is of approximately rectangular form and slidably fitted therein for longitudinal movement is a block 35 which is substantially cubical and is provided upon one side with a stud 36 about which is engaged one end of a compression spring 37, the other end of the spring seating in the inner end of the yoke as indicated by the numeral 38. The spring suitably holds the block 35 shifted to position engaging in the outer end of the yoke and the said block 35 is provided upon its opposite face with a locking stud 39 which engages through an opening in the outer end of the yoke and is adapted for engagement selectively in keeper sockets 40 and 41 formed in the opposite end walls of the slot 14 in the plate 13. A finger bail 42 is swingingly connected with the block 35, as indicated by the numeral 43 and has spaced side portions 44 slidably engaging the opposite sides of the yoke 33 so as to prevent lateral displacement of the said block.

Referring now to Figure 4 of the drawings, it will be observed that when the blade is projected, the pivot ears 30 upon the shank 29 of the blade will engage in the forward end of the slot 14 and the blade shifting member 32 will lie within the slot 14 as will also the yoke 33, and the locking stud 39 upon the block 35 will engage in the keeper socket 40 in the rear end wall of the slot 14. Therefore, the blade is securely held in projected position and cannot recede into the handle of the knife through any accidental cause. However, when it is desired to house the blade 27 within the handle of the knife, it is only necessary to grasp the bail 42 between the thumb and forefinger of one hand and slide the block 35 in the yoke 33 against the tension of the spring 37, whereupon the locking stud 39 will be retracted from the keeper socket 40 and the member 32 may then be swung upwardly about its pivot and a pull exerted thereon in the direction of the rear end of the handle, thereby retracting the blade and causing the same to finally seat within the handle and be completely housed therein as clearly shown in Figure 5. When the blade has been retracted so as to bring the pivot ears 30 into engagement with the rear end wall of the slot 14 in the plate 13, as shown in the said Figure 5, the shifting member 32 is swung over to the position shown in the said figure and the bail 42 is shifted against the tension of the spring 37 until the locking stud 39 is in position for engagement in the keeper socket 41, whereupon the bail is released and the spring will project the said stud into engagement within the said socket, thus effectually and securely locking the shifting member and blade in the position shown in Figure 5 and preventing any accidental projection of the blade. As previously pointed out, all parts of the knife are capable of being disassembled so that all parts may be thoroughly cleaned, it being understood that the two handle sections are readily separable by relative longitudinal movement and that the blade and the actuating member 32 therefor may be separated from the handle member 3 because of a slight enlargement of the ends of the slot 14 in the plate 13, as indicated by the numeral 45.

Having thus described the invention, what I claim is:

1. A knife comprising a hollow handle, a blade slidably movable to position housed within the handle and to position projecting beyond the handle, said handle having a slot at one side, a shifting member connected pivotally with the blade and arranged to lie in relatively reversed positions within the slot in the positions of adjustment of the blade, the said shifting member being manually operable to shift the blade from one position to the other, and coacting means upon the said shifting member and the handle for locking the blade in either position of adjustment, the said means comprising keeper sockets in the end walls of the slot, and a locking member upon the free end of the shifting member engageable interchangeably in said sockets.

2. A knife comprising a hollow handle, a blade slidably movable to position housed within the handle and to position projecting beyond the handle, the handle being formed in one side with a longitudinally extending slot, the end walls of the slot being provided with keeper sockets, a shifting member pivotally connected with the tang of the blade and manually operable to shift the blade from one position to the other, the said member in either shifted position of the blade being adapted to lie within the slot in the handle, an element slidably supported by the shifting member at its free end, a spring urging the member in one direction, a locking stud upon the said element engageable interchangeably in the keeper sockets in the end walls of the slot, and a finger bail connected with the said element whereby the element may be shifted to disengage the locking stud from either keeper socket and whereby, also, the blade may be shifted from one position to another by manipulation of said shifting member.

3. A knife comprising a hollow handle embodying two sections, interengaging means upon the sections providing for separation and assemblage of the sections through relative longitudinal displacement thereof, means for preventing such displacement accidentally, a blade slidably movable to position housed within the handle and to position projecting beyond the handle, and means separably engaged with one section of the handle and connected with the blade and operable to shift the blade from one position to the other.

4. A knife comprising a hollow handle embodying two sections, interengaging means upon the sections providing for separation and assemblage of the sections through relative longitudinal displacement thereof, means for preventing such displacement accidentally, a blade slidably movable to position housed within the handle and to position projecting beyond the handle, means separably engaged with one section of the handle and connected with the blade and operable to shift the blade from one position to the other, and coacting means upon the shifting means and the said section of the handle for locking the blade in either position of adjustment.

5. A knife comprising a hollow handle consisting of two sections, one comprising a plate having upstanding side flanges having inturned portions extending for a portion of their length, the said plate being provided at one end with a socket, the other section comprising a plate provided at one end at its opposite side with grooves to slidably engage and receive the said inturned portions of the flanges of the first mentioned plate, the last mentioned plate having at its other end a portion depending to close the rear end of the hollow handle and having a tongue engaging in the said recess in the plate of the first mentioned section, a blade slidably movable to position housed within the handle and to position projecting beyond the handle, and means for holding the blade in either position of adjustment.

In testimony whereof I affix my signature.

WALTER C. BOTT. [L. S.]